United States Patent
Tamura et al.

(10) Patent No.: US 6,938,613 B2
(45) Date of Patent: Sep. 6, 2005

(54) INTERNAL COMBUSTION ENGINE

(75) Inventors: Yasuki Tamura, Nisshin (JP);
Kazuhito Kawashima, Okazaki (JP);
Kazuhide Iwasa, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 10/397,382

(22) Filed: Mar. 27, 2003

(65) Prior Publication Data

US 2004/0007216 A1 Jan. 15, 2004

(30) Foreign Application Priority Data

Mar. 29, 2002 (JP) ......................................... 2002-097114

(51) Int. Cl.[7] .................................................. F02M 23/00
(52) U.S. Cl. ...................... 123/531; 123/90.15; 123/308
(58) Field of Search ............................. 123/90.15, 531, 123/568.14, 299, 298, 300, 302, 308, 431–432, 525–527; 60/285, 289

(56) References Cited

U.S. PATENT DOCUMENTS 4,395,876 A * 8/1983 Marsee et al. ................ 60/284
6,772,720 B2 * 8/2004 Majima ..................... 123/90.15
2003/0188714 A1 * 10/2003 Yamamoto et al. ......... 123/435
2004/0194755 A1 * 10/2004 Shiraishi et al. ............ 123/295

FOREIGN PATENT DOCUMENTS

| JP | 129504 | * | 4/1975 | ........... F02B/75/10 |
| JP | 293822 | * | 10/2003 | ........... F02D/41/04 |

* cited by examiner

*Primary Examiner*—Hai Huynh
(74) *Attorney, Agent, or Firm*—Birch, Stewart, Kolasch & Birch, LLP (57) ABSTRACT

An internal combustion engine is comprised of a gas injecting device injecting gas into the combustion chamber of the internal combustion engine, and a gas injection control device controlling the gas injecting device, wherein the gas injection control device provides control such that the gas is injected toward the combustion chamber for a period of time after flame extinguishing timing and before exhaust valve closing timing. Therefore, the internal combustion engine is capable of reliably combusting HC, CO, smoke, and so forth remained in a combustion chamber due to a quenching phenomenon or the like.

12 Claims, 5 Drawing Sheets

Fig.2

Providing gas injection control

S10: Whether the engine in cold or not?
S12: Whether oxygen is included in the injected gas or not?
S14: A combustion air-fuel ratio is made rich
   according to the amount of oxygen included in the injected gases.
S16: The combustion air-fuel ratio is set to a lean air-fuel ratio.
S18: Whether the flame of combustion gas has quenched or not?
S20: Gas is injected into yhe combustion chamber
   for a predetermined period of time.

INTERNAL COMBUSTION ENGINE

CROSS-REFERENCE TO THE RELATED ART

This application incorporates by reference the subject matter of Application No. 2002-097114, field in Japan on Mar. 29, 2002, on which a priority claim is based under 35 U.S.C. §119(a).

BACKGROUND OF THE INVENTION (1) Field of the Invention

The present invention relates to an internal combustion engine.

(2) Description of Related Art

A gasoline engine performs cylinder injection of fuel in three processes consisting of spark, ignition, and flame propagation.

The flame of combustion gas ignited and combusted at substantially the center of a combustion chamber propagates at a high speed to immediately spread over the combustion chamber.

If the flame spreads over the combustion chamber, burned gas combusted by the flame of the combustion gas pushes unburned gas components in unburned fuel gas to an area in the vicinity of a wall of the combustion chamber, and the unburned gas components are gradually combusted in the expansion stroke.

Incidentally, the unburned gas components pushed to the area in the vicinity of the wall of the combustion chamber by the burned gas is then brought into contact with a wall of a cylinder as the wall of the combustion chamber, or enters a piston crevice between a piston and the cylinder. On this occasion, a quenching phenomenon occurs in which the unburned gas is deprived of heat by the wall of the combustion chamber to be decreased in temperature, which inhibits the progress of combustion in the expansion stroke.

If the combustion of the unburned gas components is inhibited as described above, unburned gas components such as HC, CO, and so froth remain on the wall of the cylinder or the surface of the piston, or in the vicinity of the piston crevice even after the completion of the expansion stroke. The remaining unburned gas components (such as HC, CO, and so forth) are discharged directly into an exhaust passage in the exhaust stroke.

Further, if liquid fuel has not been satisfactorily carbureted, the fuel and the air cannot be mixed sufficiently and thus a part of the combustion gas has an excessively rich air-fuel ratio. Therefore, unburned gas components such as HC, CO, and so forth remain, or smoke and so forth are generated.

It is therefore an object of the present invention to provide an internal combustion engine that is capably of reliably combusting unburned gas components, smoke, and so forth, which are remained in a combustion chamber due to the quenching phenomenon and insufficient mixture of air and fuel.

SUMMARY OF THE INVENTION

To attain the above object, the present invention provides an internal combustion engine comprising a gas supply device supplying gas into a combustion chamber, and a gas supply control device controlling the gas supply device such that the gas is supplied into the combustion chamber after a flame quench timing during which flame of combustion gas in the combustion chamber quenches or is presumed to be quenched.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

The present invention will now be described in detail with reference to the drawings showing embodiments thereof.

First, a description will be given of a first embodiment of the present invention.

Figure 1:
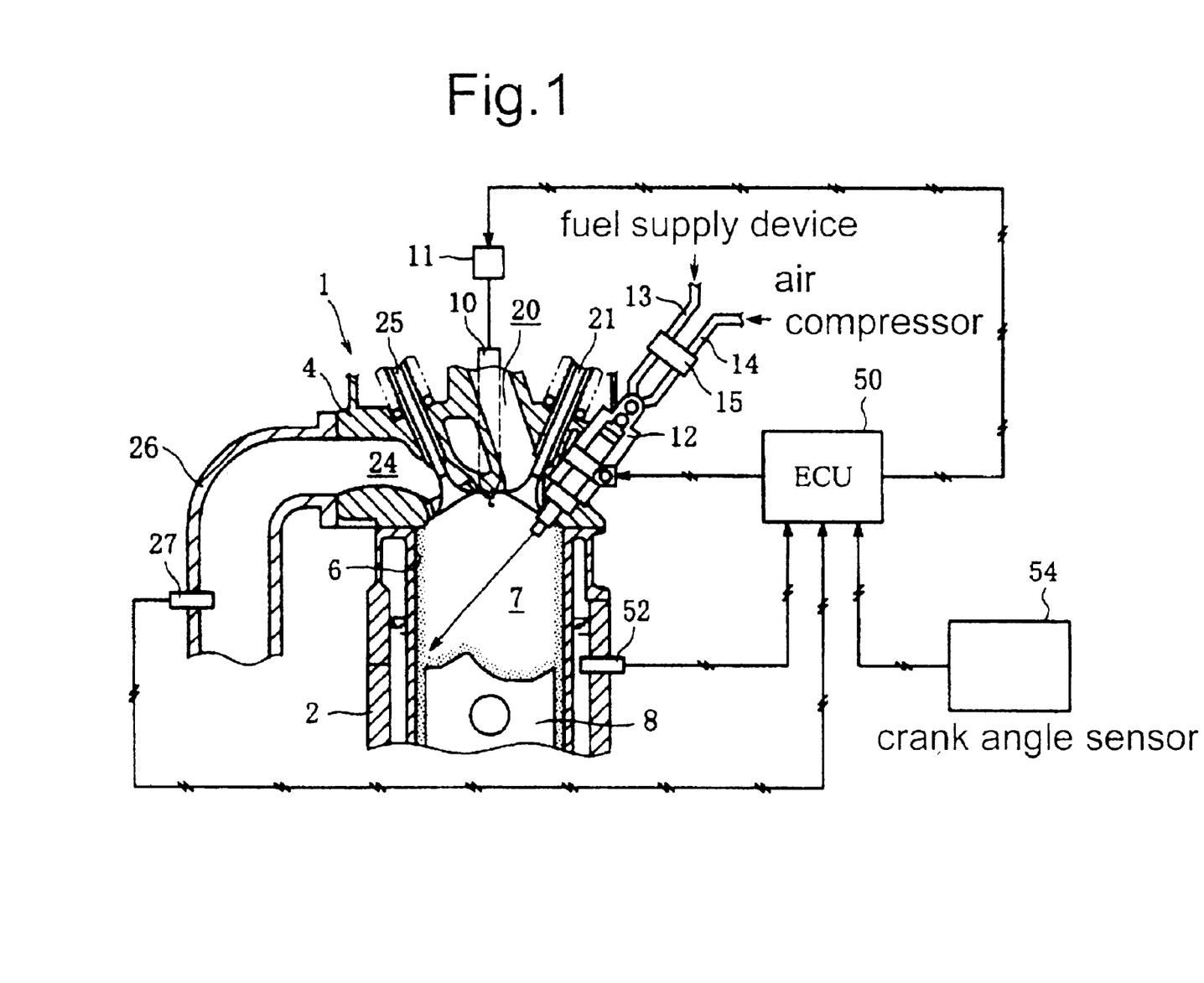
FIG. 1 is a view showing a part of the section of a cylinder of an internal combustion engine according to a first embodiment of the present invention, which is provided in a vehicle.

FIG. 1 shows a part of the section of a cylinder of an internal combustion engine according to the first embodiment, which is provided in a vehicle. A description will now be given of the construction of the internal combustion engine with reference to FIG. 1.

A cylinder injection type spark ignition 4-cycle 4-cylinder gasoline engine, for example, which is capable of performing fuel injection in the intake stroke (intake stroke injection) and fuel injection in the compression stroke (compression stroke injection) by switching fuel injection modes, is used as an internal combustion engine 1. The cylinder injection type engine 1 is capable of easily operating at a stoichiometric air-fuel ratio (stoichiometric air-fuel ratio operation), operating at a rich air-fuel ratio (rich air-fuel ratio operation), and operating at a lean air-fuel ratio (lean air-fuel ratio operation) by switching the fuel injection modes and controlling the air-fuel ratio of combustion gas.

As shown in FIG. 1, the engine 1 is constructed such that a cylinder head 4 is placed on a cylinder block 2, and a piston 8 is slidably inserted into each cylinder 6 of the cylinder block 2. An ignition plug 10 and an electromagnetic type injector (electromagnetic type fuel injection valve) 12 are attached to the cylinder head 4 of each cylinder 6. A fuel supply device, not shown, including a fuel tank is connected to the injector 12 via a fuel pipe 13 so that fuel is directly injected into a combustion chamber 7 formed by the cylinder 6 and the piston 8. In further detail, the fuel supply device is provided with a low-pressure fuel pump and a high-pressure fuel pump to supply fuel stored in the fuel tank to the injector 12 at a low fuel pressure or a high fuel pressure, and to inject the fuel from the injector 12 into the combustion chamber 7 at a desired fuel pressure. It should be noted that the injector 12 is disposed in such a position as to generate a back tumble flow (longitudinal swirl) in the combustion chamber 7.

Further, an air compressor, not shown, is connected to the injector 12 via an air pipe 14.

Further, an electromagnetic type switching valve 15, which blocks the air pipe 14 when the fuel pipe 13 is in communication with the injector 12, and blocks the fuel pipe 13 when the air pipe 14 is in communication with the injector 12, is interposed between the fuel pipe 13 and the air pipe 14. Specifically, the injector 12 is capable of supplying the fuel and the air (fresh air) by switching the electromagnetic type switching valve 15 on and off. It should be noted that the electromagnetic switching valve 15 is capable of being switched on and off at an extremely high speed.

Further, an ignition coil 11 that outputs high voltage is connected to the ignition plug 10.

The cylinder head 2 of each cylinder 6 is formed with an intake port 20 in a substantially vertical direction, and an intake manifold, not shown, has one end thereof connected to each intake port 20 such that it is in communication with each intake port 20. It should be noted that the intake manifold is provided with an electromagnetic type throttle valve, not shown, which regulates the quantity of intake air.

The cylinder head 4 of each cylinder 6 is also formed with an exhaust port 24 in a substantially horizontal direction, and an intake manifold 26 has one end thereof connected to each intake port 24 such that it is in communication with each exhaust port 24.

The exhaust manifold 24 has the other end thereof connected to an exhaust pipe, not shown, and a three-way catalytic converter, not shown, that purifies HC, CO, and $NO_x$ in exhaust is provided in the exhaust pipe. An $O_2$ sensor 27 that detects the air-fuel ratio of exhaust by detecting the oxygen concentration is disposed downstream of the exhaust manifold 26.

The cylinder head 4 is provided with an intake valve 21 that connects and disconnects the intake port 20 and the combustion chamber 7 to and from each other, and an exhaust valve 25 that connects and disconnects the exhaust port 24 and the combustion chamber 7 to and from each other. A variety of valve mechanisms (such as a cam shaft, a rocker arm, and so forth) are provided to actuate the intake valve 21 and the exhaust valve 25.

The ECU 50 is comprised of an input/output device, a storage device, a central processing unit (CPU), a timer counter, and so forth. The ECU 50 controls the overall operations of the engine 1.

A variety of sensors such as the above-mentioned $O_2$ sensor 27a, a water temperature sensor 52 that detects the cooling water temperature of the engine 1, and a crank angle sensor 54 that detects the crank angle are connected to the input side of the ECU 50, and detection information acquired by these sensors is inputted to the ECU 50.

On the other hand, the above-mentioned variety of output devices such as the ignition coil 11, injector 12, electromagnetic type switching valve 15, and throttle valve are connected to the output side of the ECU 50. Signals indicative of the fuel injection quantity, fuel injection timing, ignition timing, and so forth are outputted to the respective output devices according to the fuel injection mode selected based on the detection information and the combustion air-fuel ratio found based on the detection information. Therefore, a proper quantity of fuel and air can be injected from the injector 12 into the combustion chamber 7 in proper timing, and the ignition plug 4 performs spark ignition in proper timing.

A description will be given of the operation of the internal combustion engine constructed as described above according to the first embodiment of the present invention, that is, gas injection control according to the present invention.

Figure 2:
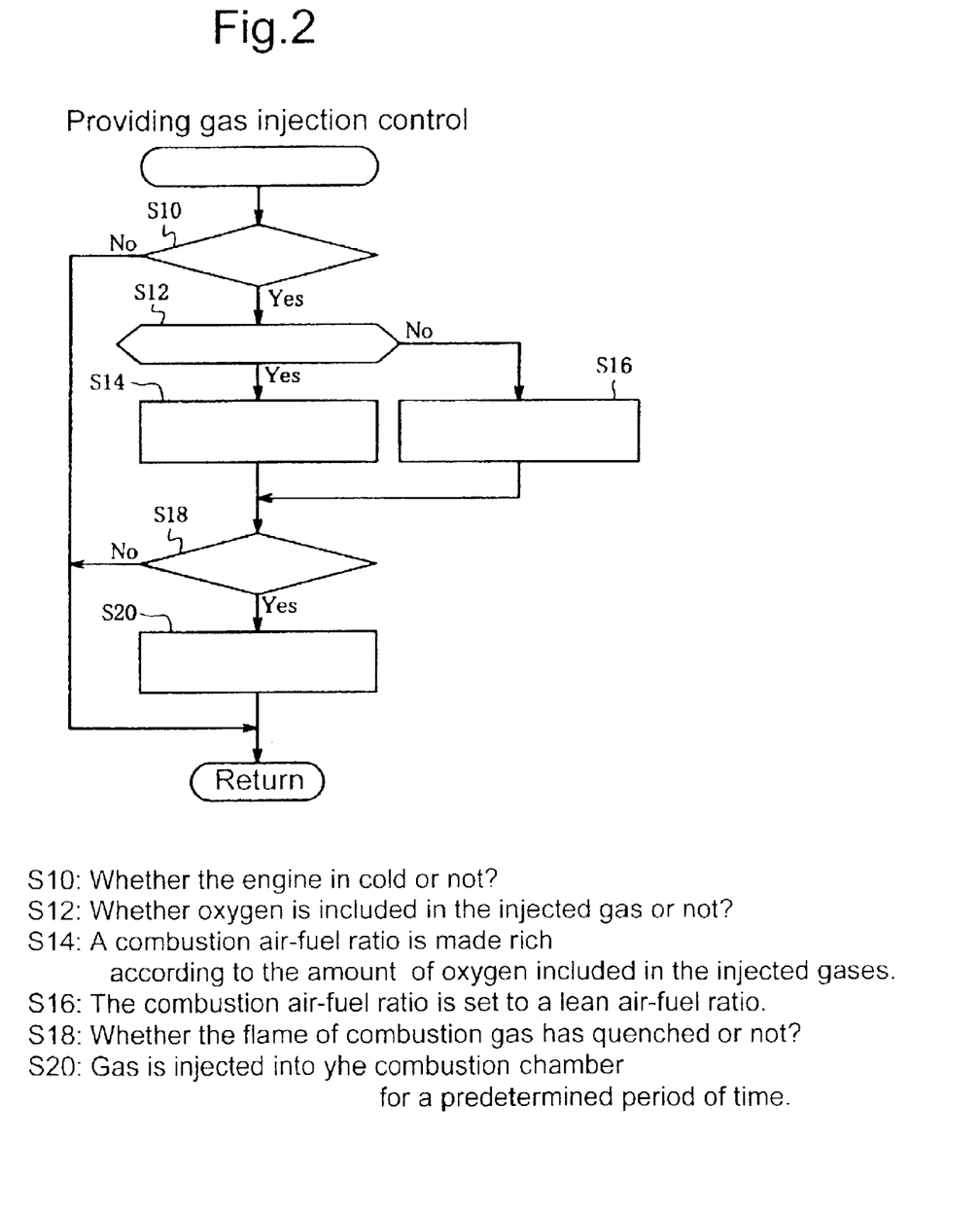
FIG. 2 is a flow chart showing a control routine of gas injection control according to the present invention.

FIG. 2 is a flow chart showing a control routine for providing gas injection control. A description will now be given of the gas injection control with reference to the flow chart of FIG. 2.

In Step S10, it is determined whether the engine 1 is cold or not. Specifically, whether or not the cooling water temperature is equal to or less than a predetermined temperature is determined according to the cooling water temperature detected by the water temperature sensor 52. If the determination result is False (No), this routine is brought to an end. On the other hand, if the determination result in the Step S10 is True (Yes), i.e. if it is determined that the engine 1 is cold, the process proceeds to Step S12.

In the Step S12, it is determined whether oxygen is included in the injected gas or not. In the present embodiment, the air (fresh air) is supplied from the injector 12, and hence, oxygen is included in the injected gas. Thus, the determination result is True (Yes), and the process proceeds to Step S14.

In the Step S14, the air-fuel ratio of combustion gas (hereinafter referred to as "combustion air-fuel ratio") is made rich according to the amount of oxygen included in the injected gases. In the present embodiment, it is assumed that a regular amount of air is injected from the injector 12, and hence, the amount of oxygen can be calculated based on the quantity of the injected air. The combustion air-fuel ratio is made rich according to the amount of oxygen. Specifically, the fuel injection quantity is set such that the air-fuel ratio of exhaust gas emitted from the combustion chamber 7 (hereinafter referred to as "exhaust air-fuel ratio") is stoichiometric or lean in the case where the air is injected. Incidentally, once the combustion air-fuel ratio has been set, the combustion air-fuel ratio is feedback-controlled to the optimum value according to the exhaust air-fuel ratio detected by the $O_2$ sensor 27.

In Step S18, the fuel whose injection quantity has been set as described above is injected from the injector 12, and then it is determined whether the flame of combustion gas combusted by ignition of the ignition plug 10 has quenched or not. Actually, the quench timing of the flame (hereinafter referred to as "flame quench timing") is found in advance by experiments, and whether the flame has quenched or not is determined according to the crank angle corresponding to the flame quench timing. In the present embodiment, it is assumed that the crank angle corresponding to the flame quench timing is set to the optimum value (found for each engine) such that the crank angle lies in the range of 50 to 130° ATDC in the expansion stroke.

If the determination result in the Step S18 is False (No), the sequence from the Steps S10 through S14 is repeated. If the determination result in the Step S18 is True (Yes), the process proceeds to Step S20.

In the Step S20, gas is injected into the combustion chamber 7 for a predetermined period of time. Specifically, the electromagnetic type switching valve 15, which has been injecting the fuel, is switched into a such a state as to inject the air, so that a predetermined quantity of air is injected from the injector 12 for a predetermined period of time (which may be arbitrarily set, and for example, set to a period of time from the flame quench timing until the closing timing of the exhaust valve 25).

The injection of the air from the injector 12 into the combustion chamber 7 as described above generates the flow of air in the combustion chamber 7. Then, unburned gas components (such as HC, CO, and so forth) pushed to a wall of the cylinder 6 or a surface of the piston 8 or an area in the vicinity of a piston crevice between the cylinder 6 and the piston 8 (hatched in FIG. 1) and remained in the vicinity of the combustion chamber due to the quenching phenomenon by burned gas is moved to the center of the combustion chamber 7, at which high-temperature burned gas exists, while being agitated by the flow of air. In particular, by injecting the air from the injector 12, a proper quantity of air can be injected into the combustion chamber 7 at a proper pressure, in a proper direction, and in proper timing with a high accuracy. Therefore, the flow of air is constantly generated in a stable manner, and the remaining HC, CO, and so forth are agitated satisfactorily and moved into the high-temperature burned gas.

Consequently, the remaining HC, CO, and so forth are activated to be reliably combusted in the combustion chamber 7, reducing the emission of HC, CO, and so forth. In particular, when the internal combustion engine is cold (mainly at the time of cold-starting), the emission of HC, CO, and so forth can be greatly reduced.

Further, in the present embodiment, since the combustion air-fuel ratio is set such that the exhaust air-fuel ratio is stoichiometric or lean, the remaining HC, CO, and so forth can be reliably combusted in the presence of a sufficient amount of oxygen without the possibility that oxygen runs short in the combustion chamber 7 as a whole. Further, since the exhaust air-fuel ratio is set to a stoichiometric air-fuel ratio or a lean air-fuel ratio, the emission of HC, CO, and so forth can be reduced satisfactorily without the necessity of using the three-way catalytic converter when the three-way catalytic converter has not yet been activated at the time of cold-starting.

Incidentally, although in the present embodiment, the air (fresh air) is injected from the injector 12, the present invention is not limited to this, but it may be arranged that a part of exhaust gas emitted from the combustion chamber 7 is compressed by the compressor and the compressed exhaust gas is injected from the injector 12 into the combustion chamber 7. In this case, when it is determined that the exhaust air-fuel ratio is stoichiometric or rich according to the information supplied from the $O_2$ sensor 27, no oxygen is included in the exhaust gas injected into the combustion chamber 7, and hence, the determination result in the Step S12 is False (No). In this case, the process proceeds to Step S16 wherein the combustion air-fuel ratio is set to a lean air-fuel ratio. In this case, the combustion air-fuel ratio is set such that the exhaust air-fuel ratio is stoichiometric or lean, and in the case where the exhaust air-fuel ratio is stoichiometric, the combustion air-fuel ratio should not necessarily be set to a lean air-fuel ratio but may be set to a stoichiometric air-fuel ratio.

Further, even if the electromagnetic type switching valve 15 is switched so as to inject gases (air and exhaust gas) from the injector 12, the remaining fuel in the injector 12 is actually injected at the same time. Thus, the remaining fuel may be emitted once from the injector 12 in suitable timing in which the remaining fuel can be ignited before the flame quench timing. This makes it possible to supply only the gases supplied when the flame has quenched.

Further, although in the present embodiment, both fuel and gases (air and exhaust gas) can be injected from the injector 12, the present invention is not limited to this, but the injector 12 may be exclusively used for injecting the fuel and an additional injector may be provided to supply gases. In this case, the additional injector for supplying gases may be provided on the wall of the exhaust port 24 to inject gases into the combustion chamber 7 when the exhaust valve 25 is opened.

Further, although in the present embodiment, the present invention is only applied to the case where the engine 1 is cold, but the present invention may be applied either to the case where the engine 1 is cold or to the case where the engine 1 is warm or may be applied only to the case where the engine 1 is warm.

A description will now be given of a second embodiment of the present invention.

Figure 3:
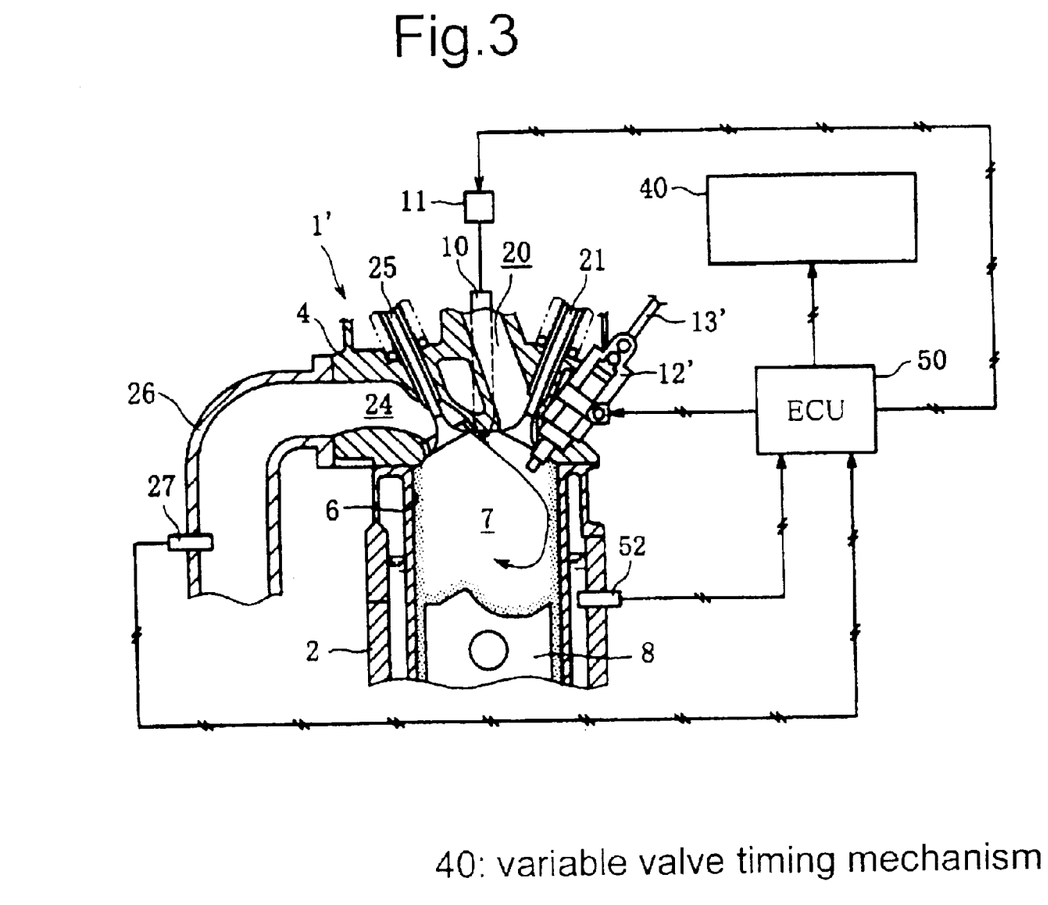
FIG. 3 is a view showing a part of the section of a cylinder of an internal combustion engine according to a second embodiment of the present invention, which is provided in a vehicle.

FIG. 3 shows a part of the section of a cylinder of an internal combustion engine according to the second embodiment. A description will now be given of the construction of the internal combustion engine according to the second embodiment with reference to FIG. 3. The construction of the internal combustion engine according to the second embodiment is basically the same as that of the engine 1 according to the first embodiment, and hence, elements and parts corresponding to those of the engine 1 are denoted by the same reference numerals and description thereof is omitted.

As shown in FIG. 3, an engine 1' as the internal combustion engine according to the second embodiment is constructed such that only a fuel supply device, not shown, including a fuel tank is connected to an electromagnetic type injector 12' via a fuel pipe 13'. Namely, the injector 12' is capable of injecting only fuel into the combustion chamber 7.

Further, the engine 1' is provided with the intake valve 21 and the exhaust valve 25 as in the first embodiment, and the valve mechanism for the intake valve 21 and the exhaust valve 25 is provided with a variable valve timing mechanism 40 that is capable of adjusting the opening and closing timing of the intake valve 21 and the exhaust valve 25. Note that the variable valve timing mechanism 40 is known, and detailed description thereof is omitted.

A description will now be given of gas injection control according to the second embodiment constructed as described above. It should be noted that the control routine in FIG. 2 is directly applied to the air injection control according to the second embodiment, and therefore only a difference between the first embodiment and the second embodiment will be described.

Figure 4:
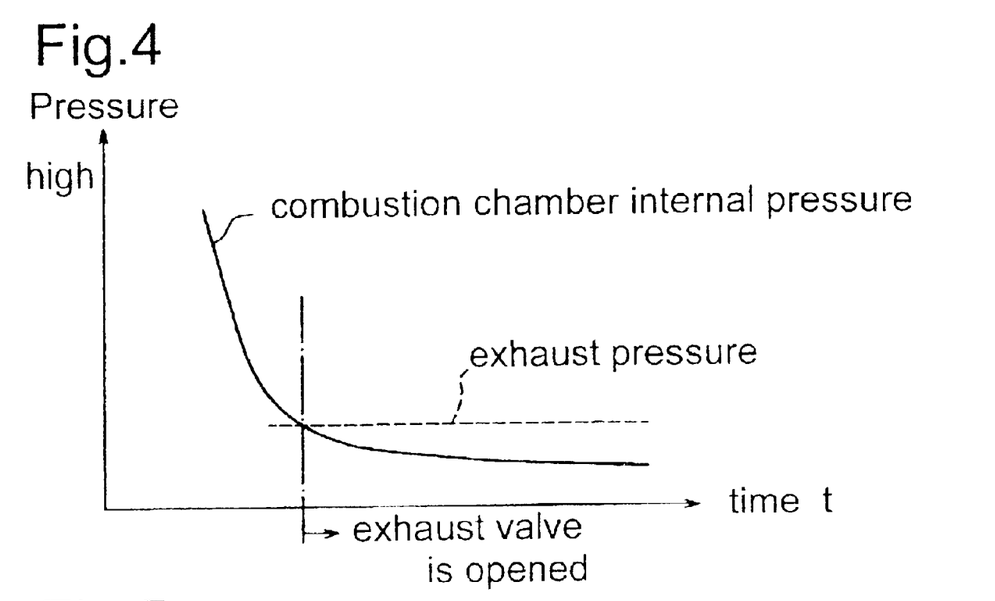
FIG. 4 is a diagram showing the relationship between the exhaust pressure and the combustion chamber internal pressure in the case where the actual expansion ratio is made higher than the actual compression ratio.

In the second embodiment, in the Step S20 in FIG. 2, the variable valve timing mechanism 40 is operated to make the closing timing of the intake valve 21 earlier to become further from the intake lower dead center. This reduces the quantity of intake air to make the actual compression ratio lower than the actual expansion ratio. Conversely, the actual expansion ratio is made lower than the actual compression ratio, and the internal pressure of the combustion chamber 7 is lowered at the end of the expansion stroke. Thus, in this case, at the end of the expansion stroke, the pressure of exhaust gas indicated by a broken line (hereinafter referred to as "exhaust pressure") becomes higher than the internal pressure of the combustion chamber 7 indicated by a solid line (hereinafter refereed to as "combustion chamber internal pressure") as shown in FIG. 4, and when the exhaust valve 25 is opened at the end of the expansion stroke (after a time point indicated by a dash line in FIG. 4), a part of the exhaust gas in the exhaust port 24 flows back into the combustion chamber 7. If a part of the exhaust gas flows back into the combustion chamber 7 via the exhaust valve 25, the exhaust gas is satisfactorily diffused in the vicinity of the wall of the combustion chamber 7 by a valve head, and HC, CO, and so forth remaining as unburned gases in the vicinity of the wall of the combustion chamber 7 due to the quenching phenomenon are agitated in a preferable manner by the exhaust gas flowing back into the combustion chamber 7, so that the remaining HC, CO, and so forth move into the high-temperature combustion gas.

As a result, the remaining HC, CO, and so forth are activated to be reliably combusted in the combustion chamber, and the emission of HC, CO, and so forth can be reduced with such a simple arrangement that the valve timing is varied.

Incidentally, if the actual expansion ratio is made higher than the actual compression ratio, the closing timing of the intake valve 21 may be made later to become further from the intake lower dead center to lower the actual compression ratio, or the opening timing of the intake valve 25 may be made closer to the expansion lower dead center to raise the actual expansion ratio. In this case, if the closing timing of the intake valve 21 is made further from the intake lower dead center and the opening timing of the exhaust valve 25 is made closer to the expansion lower dead center, the internal pressure of the combustion chamber 7 is further lowered to increase the flow rate of exhaust gas, so that the remaining HC, CO, and so forth can be combusted more reliably.

Further, an exhaust pressure increase mechanism such as an exhaust aperture valve capable of increasing the exhaust pressure while suppressing the exhaust flow may be provided in the exhaust pipe. Increasing the exhaust pressure with this arrangement increases a differential pressure between the internal pressure of the combustion chamber 7 and the exhaust pressure, making it possible to combust the remaining HC, CO, and so forth more reliably.

A description will now be given of a third embodiment of the present invention.

Figure 5:
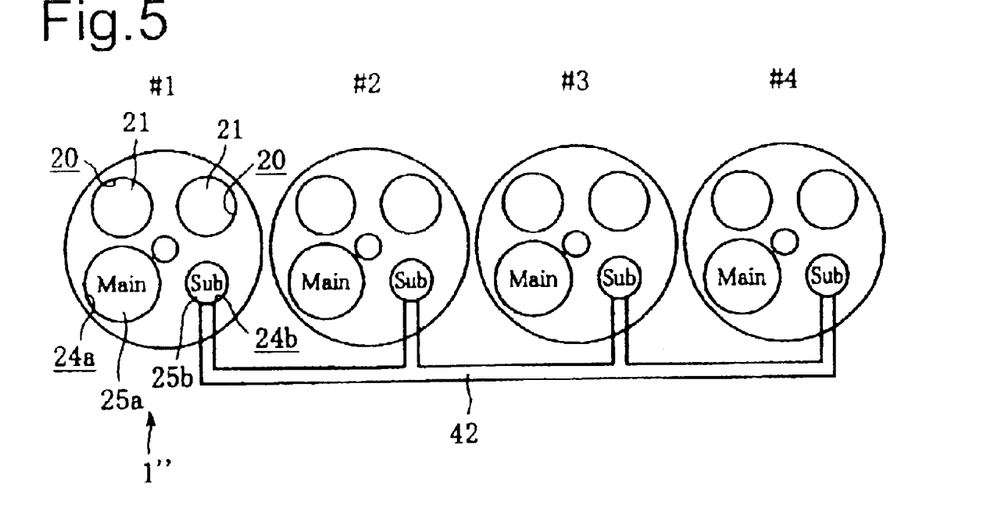
FIG. 5 is a diagram schematically showing an internal combustion engine according to a third embodiment of the present invention.

FIG. 5 is a diagram schematically showing an internal combustion engine according to the third embodiment. A description will now be given of the construction of the internal combustion engine according to the third embodiment with reference to FIG. 5. The internal combustion engine according to the third embodiment is a cylinder injection type spark ignition 4-cycle 4-cylinder gasoline engine constructed in basically the same manner as the engines 1 and 1' according to the first and second embodiments, and therefore only a difference between the third embodiment and the first and second embodiments will be described below.

An engine 1" as the internal combustion engine according to the third embodiment is constructed such that the cylinder head 4 of each cylinder 6 is provided with two exhaust ports consisting of a large-diameter exhaust port 24a and a small-diameter exhaust port 24b, and as shown in FIG. 5, a main exhaust valve (hereinafter referred to as "main valve") 25a with a large-diameter head, and a sub exhaust valve (hereinafter referred to as "sub valve") 25B with a small-diameter head are provided in the exhaust port 24a and the exhaust port 24b, respectively.

The main valves 25a and the sub valves 25b are adapted to be opened and closed in respective predetermined opening and closing patterns. Specifically, the cam profile for the main valve 25a and the cam profile for the sub valve 25b are individually set. It should be noted that due to the operation of the variable valve timing mechanism 40, the main valve 25a is normally operated independently in a predetermined opening and closing pattern with the sub valve 25a being at rest.

As shown in FIG. 5, the small-diameter exhaust ports 24b provided in the respective cylinders are connected to an exhaust communication path 42 such that they are in communication with each other.

A description will now be given of gas injection control according to the third embodiment constructed as described above. It should be noted that the control routine in FIG. 2 is directly applied to the gas injection control according to the second embodiment, and therefore only a difference between the first embodiment and the third embodiment will be described.

Figure 6:
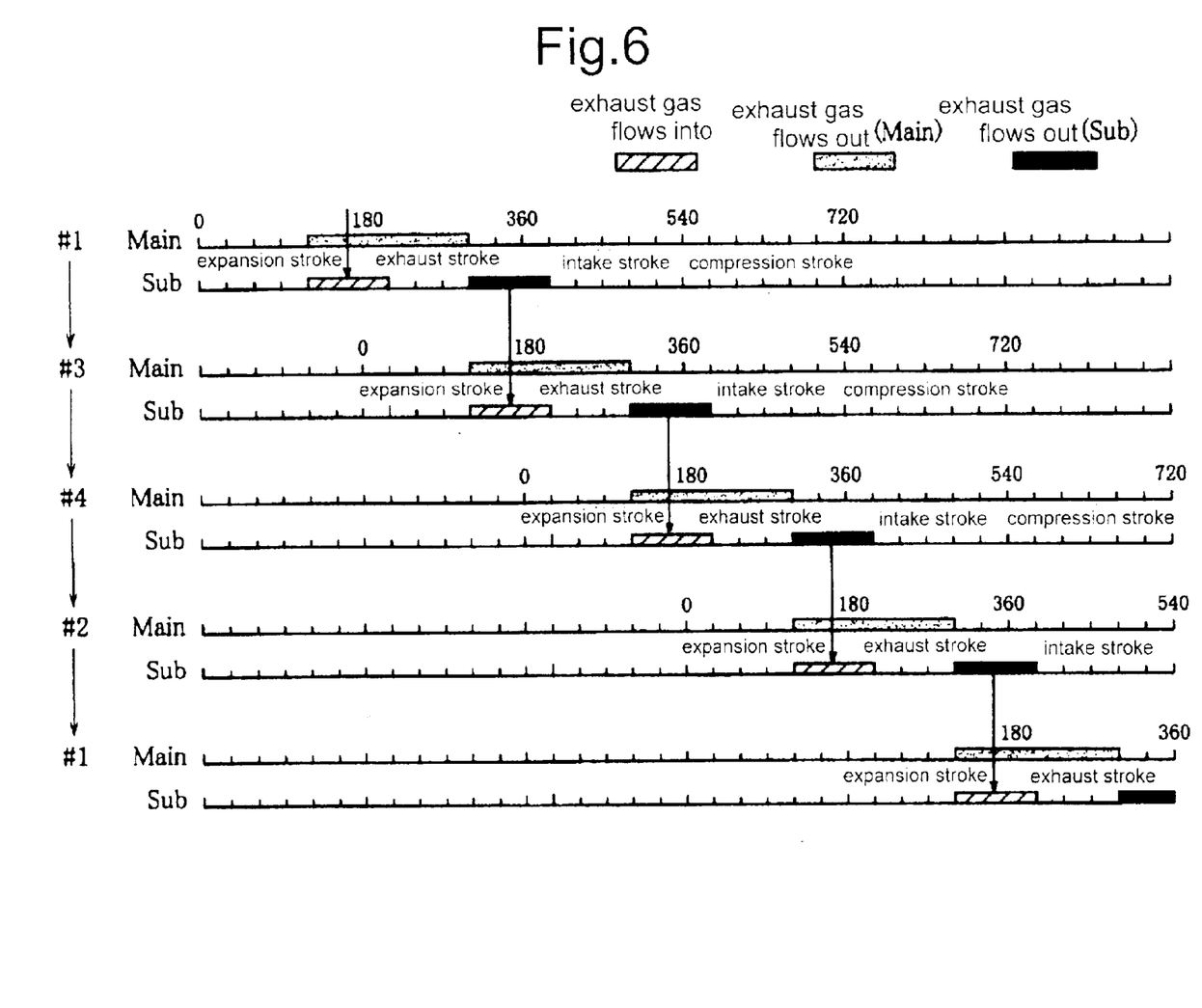
FIG. 6 is a diagram showing the opening and closing patterns of main valves and sub valves according to the third embodiment.

In the third embodiment, in the Step S20 in FIG. 2, the main valves 25a and the sub valves 25b are opened and closed according to the predetermined opening and closing pattern shown in FIG. 6 (gas injection control device).

FIG. 6 shows the opening and closing patterns of the main valves 25a and the sub valves 25b in the order of combustion cylinders (#1-#2-#3-#4). In the present embodiment, upon opening of the main valve 25a of the cylinder #1 at the end of the expansion stroke, the sub valve 25b of the cylinder #1 is temporarily opened for a predetermined period of time (indicated by diagonal lines in FIG. 6). Then, upon closing of the main valve 25a of the cylinder #1 is closed at the end of the exhaust stroke, the sub valve 25b of the cylinder #1 is temporarily opened again for a predetermined period of time (blacked out in FIG. 6). When the sub valve 25b is opened again for the predetermined period of time, the main valve 25a of the cylinder #3 as the next combustion cylinder is opened at the end of the expansion stroke, and at the same time, the sub valve 25b of the cylinder #3 is temporarily opened for a predetermined period of time (indicated by diagonal lines in FIG. 6). Thereafter, the main valves 25a and sub valves 25b of the respective cylinders are opened and closed repeatedly in the same manner.

Specifically, in the third embodiment, as indicated by arrows in FIG. 6, for the predetermined period of time (blacked out in FIG. 6) at the end of the exhaust stroke in the previous combustion cylinder, high-pressure exhaust gas pushed out from the previous combustion cylinder via the sub valve 25b due to the lift of the piston 8 is caused to pass through the exhaust communication path 42 to flow into the combustion chamber 7 for the predetermined period of time (indicated by diagonal lines in FIG. 6) at the end of the expansion stroke where the internal pressure of the combustion chamber 7 is low.

Therefore, the exhaust gas emitted from the previous combustion cylinder and flowing into the combustion chamber 7 via the exhaust valve 25 is satisfactorily diffused in the vicinity of the wall of the combustion chamber 7 by the valve head of the sub valve 25b, and HC, CO, and so forth remained as unburned gases in the vicinity of the wall of the combustion chamber due to the quenching phenomenon are satisfactorily agitated by the flowing exhaust gas and move into the high-temperature combustion gas.

As a result, the remaining HC, CO, and so forth are activated to be reliably combusted in the combustion chamber 7, and the emission of HC, CO, and so forth can be reduced with such a simple arrangement that exhaust gas emitted from the previous combustion cylinder is used.

In this case, it is preferred that the opening timing of the intake valve 21 and the closing timing of the sub valve 25b are not overlapped, and this prevents exhaust gas from flowing back into an intake system and enables exhaust gas to be satisfactorily emitted into the exhaust communication path 42 via the sub valve 25b.

Further, although in the present embodiment, the sub valve 25b is a cam-driven valve, the present invention is not limited to this, but an electromagnetic type valve may be used as the sub valve 25b to simplify the system.

Further, although in the present embodiment, the sub valves 25b are opened in the same timing in the predetermined period of time in which exhaust gas flows out from the previous combustion cylinder (blacked out in FIG. 6) and in the predetermined period of time in which exhaust gas flows into the combustion chamber 7 (indicated by diagonal lines in FIG. 6), but the start timing of the predetermined period of time in which exhaust gas flows out from the previous combustion cylinder (painted in black in FIG. 6) or the start timing of the predetermined period of time in which the exhaust gas flows into the combustion chamber 7 (indicated by diagonal lines in FIG. 6) may be advanced to increase the exhaust pressure in the exhaust communication path 42 and to raise the flow rate of the exhaust gas into the combustion chamber 7. However, if there is concern that the fuel economy deteriorates due to an increase in exhaust pump loss, it is preferred that the sub valves 25b are opened in the same timing.

Further, although in the present embodiment, the closing timing of the sub valve 25b upon the lapse of the predetermined period of time (blacked out in FIG. 6) is set behind the upper dead center, but in a range with a small exhaust inertia effect, the closing timing of the sub valve 25b may be set in the vicinity of the upper dead center.

Further, although in the present embodiment, the sub valve 25b is closed during a period between the predetermined period of time in which the exhaust gas flows into the combustion chamber 7 (indicated by diagonal lines in FIG. 6) and the predetermined period of time in which the exhaust gas flow out (blacked out in FIG. 6), the sub valve 25b may be opened during this period. This improves reliability without making the cam lift characteristics complicated.

Further, although in the present embodiment, the remaining HC, CO, and so forth are agitated by exhaust gas flowing into the combustion chamber 7 from the previous combustion chamber via the sub valve 25b, but in place of the sub valve 25b, an opening and closing valve may be provided independently of the exhaust valve 25b so that the remaining HC, CO, and so forth can be agitated by the compressed air flown into the combustion chamber 7 by opening this opening and closing valve.

In this case, for example, there may be provided an accumulating chamber that temporarily accumulates gas in the compression stroke, and the opening and closing valve is opened at the end of the expansion stroke to emit the gas accumulated in the accumulating chamber into the combustion chamber 7 again.

It should be understood that the present invention is not limited to the embodiments described above, but various variations of the above described embodiments may be possible without departing from the spirits of the present invention, including variations as described below, for example.

Although in the above described embodiments, the cylinder injection type spark ignition type 4-cycle 4-cylinder gasoline engine is used as the engine 1, the present invention is not limited to this, but an intake pipe injection type gasoline engine, 2-cycle gasoline engine, diesel engine, or the like may be used as the engine 1, 1', or 1".

Further, the secondary air technique (including the exhaust air technique), two-stage combustion technique, and compression slight-lean combustion technique may be used in combination with the present invention to reduce the emission of HC, CO, and so forth more effectively.

As described above, the above described internal combustion engine supplies gas (flesh air or exhaust gas) into the combustion chamber 7 in a predetermined period of time set in the period from the flame quench timing until the exhaust valve opening timing, so that HC, CO, and so forth remaining in the combustion chamber and in the vicinity of the wall thereof due to the quenching phenomenon are moved into the high-temperature combustion gas and activated while being agitated. As a result, it is possible to reduce the emission of HC, CO, and so forth not only when the internal combustion engine is warm but also when the internal combustion engine is cold-started.

Further, when gas is supplied into the combustion chamber 7, the combustion air-fuel ratio is controlled such that the exhaust air-fuel ratio is stoichiometric or lean. Therefore, the remaining HC, CO, and so forth can be reliably combusted in the presence of a sufficient amount of oxygen. In particular, when the internal combustion engine is cold-started, the emission of HC, CO, and so forth can be reduced satisfactorily.

Further, in the case where oxygen is included in gas supplied into the combustion chamber, the combustion air-fuel ratio is controlled to be stoichiometric according to the amount of oxygen included in the gas, so that the exhaust air-fuel ratio can be controlled to be stoichiometric or lean in a preferable manner.

Further, the electromagnetic type injection valve enable the optimum quantity of gas to be supplied into the combustion chamber at the optimum pressure, in the optimum direction, and in the optimum timing with a high accuracy, so that the remaining HC, CO, and so forth are moved into the high-temperature combustion gas while being agitated in a preferable manner and reliably combusted in the combustion chamber. Incidentally, if the electromagnetic injection valve is disposed at such a location that the injected gas generates a swirl in the combustion chamber, the remaining HC, CO, and so forth can be reliably moved into the high-temperature combustion gas while being agitated in a preferable manner.

Further, since the internal pressure of the combustion chamber is made lower than the exhaust pressure by making the actual expansion ratio higher than the actual compression ratio, a differential pressure between the internal pressure of the combustion chamber and the exhaust pressure can be at a relatively high level. If the exhaust valve is opened in this state at the end of the expansion stroke, a part of the exhaust gas flows back into the combustion chamber, making it possible to move the remaining HC, CO, and so forth into the high-temperature combustion gas while agitating them in a preferable manner and to reliably combust them in the combustion chamber.

Further, since the cam-driven opening and closing valve is provided independently of the intake valve and the exhaust valve, and gas is supplied toward the combustion chamber when the opening and closing valves is opened, the optimum amount of gas can be mechanically injected into the combustion chamber at the optimum pressure, in the optimum direction, and in the optimum timing with a high reliability, and the remaining HC, CO, and so forth can be moved into the high-temperature combustion gas while being agitated in a preferable manner and combusted reliably in the combustion chamber.

Further, since the exhaust ports in the vicinity of the exhaust valves are brought into communication with each other in the 4-cycle 4-cylinder internal combustion engine, for example, a part of the high-pressure exhaust gas pushed out from the previous combustion cylinder with the lift of the piston can be swiftly flown into the combustion chamber, and the remaining HC, CO, and so forth can be moved into the high-temperature combustion gas while being agitated in a preferable manner and combusted reliably in the combustion chamber with a simple arrangement.

What is claimed is:

1. An internal combustion engine comprising:
   a gas supply device supplying gas into a combustion chamber;
   a gas supply control device controlling said gas supply device such that the gas is supplied into the combustion chamber after a flame quench timing during which flame of combustion gas in the combustion chamber quenches or is presumed to be quenched, thereby moving unburned gas components into high-temperature burned gas for combustion; and
   an air-fuel control device controlling an air-fuel ratio of the combustion gas, wherein said air-fuel control device selectively controls, when said gas supply device supplies the gas into the combustion chamber, the air-fuel ratio of the combustion gas such that an air-fuel ratio of exhaust gas emitted from the combustion chamber is stoichiometric or lean.

2. An internal combustion engine according to claim 1, further comprising:
   an exhaust valve connecting and disconnecting an exhaust port and said combustion chamber to and from each other;
   wherein said gas supply control device controls said gas supply device for a predetermined period before said exhaust valve is closed.

3. An internal combustion engine according to claim 2, further comprising:
   an intake valve connecting and disconnecting an intake port and said combustion chamber to and from each other; and
   an opening and closing valve provided separately from said intake valve and said exhaust valve;
   wherein said gas supply device comprises an opening and closing valve to supply the gas into the combustion chamber when said opening and closing valve is opened.

4. An internal combustion engine according to claim 1, further comprising:
   a crank angle sensor detecting a crank angle of the internal combustion engine;
   wherein said gas supply control device determines whether the flame has quenched according to the crank angle, corresponding said flame quench timing, detected by said crank angle sensor.

5. An internal combustion engine according to claim 1, wherein said air-fuel control device selectively controls the air-fuel ratio of the combustion gas to a rich air-fuel ratio according to an amount of oxygen included in the gas supplied to the combustion chamber by said gas supply device.

6. An internal combustion engine according to claim 1, wherein said gas supply device comprises an electromagnetic type injector that injects the gas into the combustion chamber.

7. An internal combustion engine according to claim 6, wherein said electromagnetic type injector is disposed such that the injected gas generates a swirl in the combustion chamber.

8. An internal combustion engine according to claim 6, wherein the internal combustion engine comprises a multiple cylinder internal combustion engine, and said gas supply device causes a part of the exhaust gas emitted from a cylinder in charge of previous combustion to be flown into the combustion chamber.

9. An internal combustion engine according to claim 1, wherein the gas supplied to the combustion chamber by said gas supply device is a part of exhaust gas emitted from the combustion chamber.

10. An internal combustion engine according to claim 9, wherein said gas supply device cause a part of the exhaust gas to be flown back into the combustion chamber by making an internal pressure of the combustion chamber lower than a pressure of the exhaust gas.

11. An internal combustion engine according to claim 10, wherein said gas supply device makes the internal pressure of the combustion chamber lower than the pressure of the exhaust gas by making an expansion ratio higher than a compression ratio.

12. An internal combustion engine according to claim 11, further comprising:
   a variable valve timing mechanism adjusting the opening and closing of at least one of an intake valve and an exhaust valve;
   wherein said gas supply device makes the expansion ratio higher than the compression ratio by opening and closing timing of at least one of an intake valve and the exhaust valve changed by said variable valve timing mechanism.

* * * * *